(12) United States Patent
Maede et al.

(10) Patent No.: US 11,914,219 B2
(45) Date of Patent: *Feb. 27, 2024

(54) ACTUATOR DRIVER

(71) Applicant: ROHM CO., LTD., Kyoto (JP)

(72) Inventors: Jun Maede, Kyoto (JP); Akihito Saito, Kyoto (JP); Yoshihiro Sekimoto, Kyoto (JP)

(73) Assignee: ROHM CO., LTD., Kyoto (JP)

(*) Notice: Subject to any disclaimer, the term of this patent is extended or adjusted under 35 U.S.C. 154(b) by 26 days.

This patent is subject to a terminal disclaimer.

(21) Appl. No.: 17/348,030

(22) Filed: Jun. 15, 2021

(65) Prior Publication Data

US 2021/0311283 A1 Oct. 7, 2021

Related U.S. Application Data

(62) Division of application No. 15/726,802, filed on Oct. 6, 2017, now Pat. No. 11,067,767.

(30) Foreign Application Priority Data

Oct. 7, 2016 (JP) .................. 2016-198760
Jun. 16, 2017 (JP) .................. 2017-118635

(51) Int. Cl.
*G02B 7/02* (2021.01)
*G02B 7/08* (2021.01)
(Continued)

(52) U.S. Cl.
CPC ............ *G02B 7/028* (2013.01); *G01D 3/036* (2013.01); *G01D 3/0365* (2013.01); *G01D 5/145* (2013.01);
(Continued)

(58) Field of Classification Search
CPC .......... G02B 7/028; G02B 7/08; G01D 3/036; G01D 3/0365; G01D 5/145; G01J 1/0403; G01K 13/00; H02K 11/215; H02K 11/22
(Continued)

(56) References Cited

U.S. PATENT DOCUMENTS

| | | | | |
|---|---|---|---|---|
| 3,284,726 A | * | 11/1966 | Kotecki | ............... H03G 7/004 330/6 |
| 11,067,767 B2 | * | 7/2021 | Maede | ................... G01D 5/145 |
| 2014/0379103 A1 | * | 12/2014 | Ishikawa | ............... H02P 29/685 700/56 |

FOREIGN PATENT DOCUMENTS

| JP | H03261869 A | 11/1991 |
|---|---|---|
| JP | 2000047084 A | 2/2000 |

(Continued)

OTHER PUBLICATIONS

JPO Notice of Reasons for Refusal for corresponding JP Application No. 2017-118635; dated Mar. 9, 2021.

(Continued)

*Primary Examiner* — Wyatt A Stoffa
*Assistant Examiner* — Mitchell T Oestreich
(74) *Attorney, Agent, or Firm* — CANTOR COLBURN LLP

(57) ABSTRACT

A position detection unit generates a position detection value $P_{FB}$ that indicates the position of a control target. A temperature detection unit generates a temperature detection value that indicates the temperature. A correction unit corrects the position detection value $P_{FB}$. A controller generates a control instruction value $S_{REF}$ such that the position detection value $P_{FB\_CMP}$ subjected to the correction matches a position instruction value $P_{REF}$ that indicates the target position of the control target. A driver unit applies a driving signal that corresponds to the control instruction value $S_{REF}$ to an actuator. The correction unit corrects the position (Continued)

detection value $P_{FB}$ such that the relation between the position detection value $P_{FB}$ and the actual position exhibits linearity that is uniform independent of the temperature.

8 Claims, 10 Drawing Sheets

(51) Int. Cl.
    *G01J 1/04*           (2006.01)
    *G01D 5/14*           (2006.01)
    *G01D 3/036*         (2006.01)
    *G01K 13/00*         (2021.01)
    *H02K 11/22*         (2016.01)
    *H02K 11/215*       (2016.01)

(52) U.S. Cl.
    CPC ............ *G01J 1/0403* (2013.01); *G01K 13/00* (2013.01); *G02B 7/08* (2013.01); *H02K 11/215* (2016.01); *H02K 11/22* (2016.01)

(58) Field of Classification Search
    USPC .......................................................... 359/820
    See application file for complete search history.

(56) References Cited

FOREIGN PATENT DOCUMENTS

| | | |
|---|---|---|
| JP | 2009145635 A | 7/2009 |
| JP | 2011048276 A | 3/2011 |
| JP | 2013205550 A | 10/2013 |
| JP | 2014179913 A | 9/2014 |
| WO | 2009093645 A1 | 7/2009 |
| WO | 2016006168 A1 | 1/2016 |

OTHER PUBLICATIONS

USPTO Non-Final Office Action for corresponding U.S. Appl. No. 15/726,802; dated Sep. 4, 2020.
JPO Notice of Reasons for Refusal for corresponding JP Patent Application No. 2017-118635; dated Oct. 5, 2021.

* cited by examiner

ACTUATOR DRIVER

CROSS REFERENCE TO RELATED APPLICATIONS

The present application is a divisional application of U.S. patent application Ser. No. 15/726,802, filed on Oct. 6, 2017, the entire contents of which are incorporated herein by reference. The Ser. No. 15/726,802 application claimed the benefit of the date of the earlier filed by Japanese Application No. 2017-118635, filed Jun. 16, 2017 and Japanese Application No. 2016-198760, filed Oct. 7, 2016, the entire content of which is incorporated herein by reference.

BACKGROUND OF THE INVENTION

Field of the Invention

The present invention relates to an actuator driver, a lens control apparatus, and an image capture apparatus employing the lens control apparatus.

Description of the Related Art

In recent years, with camera modules to be mounted on a smartphone or the like, an increasing number of such camera modules have a function of detecting the position of an image capture lens, and of controlling the position of the image capture lens with high speed and high precision by feeding back the position information thus detected. By employing such a feedback control operation for an autofocus operation, this enables a high-precision, high-speed autofocus operation. Also, by employing such a feedback control operation for optical image stabilization (OIS), this enables high-precision image stabilization. With cameras employing such a feedback control operation, in a case in which the position detection signal varies due to temperature, in some cases, this leads to the occurrence of control error. Typical OIS is designed as a linear control operation. Accordingly, it is important to secure linearity between the position detection signal and the actual position.

In particular, with image capture apparatuses that include an image sensor having a phase difference detection function in order to support an autofocus operation, the position of the image capture lens is directly changed up to the position indicated by the output value of a position detection signal that corresponds to the focal position estimated based on the phase difference detection, thereby providing a high-speed autofocus operation. In a case in which deviation occurs in the relation between the focal position and the output value of the position detection signal due to a change in temperature, this leads to accessing a position that deviates from the focal position. This requires additional time for focusing. Also, such an arrangement displaces the image capture lens to a target position assuming that there is a linear relation between the target position and the position detection signal. Accordingly, in a case in which deviation occurs in the linearity between the position detection signal and the change in position, this also leads to accessing a position that deviates from the focal position. As described above, with such an image capture apparatus including an image sensor having a phase difference detection function, it is important to support both temperature compensation and linearity compensation.

Also, with an image capture apparatus including multiple camera modules, which is referred to as a "dual camera" or the like, in some cases, there is a need to perform control so as to interlink the operations of the multiple camera modules. With such an arrangement, in a case in which deviation due to temperature occurs in the relation between the position detection signal and the actual position, this leads to deviation in the interlinking between the two camera modules. In some cases, this leads to adverse effects on image generation. Also, in a case in which deviation has occurred in the linearity of the relation between the position detection signal and the change in position, this leads to deviation in the interlinking between them. In some cases, this also leads to adverse effects on image generation. As described above, in such an image capture apparatus including multiple camera modules, it is also important to support both temperature compensation and linearity compensation.

A driving apparatus is described in Patent document 1 (WO 2009/093645), configured to detect the surrounding temperature based on a resistance value of a shape memory alloy member, and to correct the slope component and the offset component of the relation between the control value and the change in position characteristic based on the difference between the surrounding temperature and the reference temperature. A control circuit is described in Patent document 2 (Japanese Patent Application Laid Open No. 2009-145635), configured to perform correction based on a correction function stored beforehand such that the output signal of the position detector exhibits linearity.

In Patent document 1, temperature compensation is described in which the surrounding temperature is detected based on the resistance value of a shape memory alloy member, and the slope component and the offset component of the relation between the control value and the change in position characteristic are corrected based on the difference between the surrounding temperature and a reference temperature. However, the relation between the control value and the change in position characteristic is derived based on factory measurement values of two particular positions and the corresponding control values. Specifically, the relation between the control value and the change in position characteristic is derived by defining a straight line that passes through the two positions. Thus, such temperature compensation by no means supports a case in which there is a nonlinear relation between them.

In Patent document 2, linearity compensation is described in which correction is performed based on a correction function stored beforehand such that the output signal of the position detector exhibits linearity. However, such linearity compensation by no means supports a change in characteristics due to a change in temperature.

SUMMARY OF THE INVENTION

The present invention has been made in view of such a situation. Accordingly, it is an exemplary purpose of an embodiment of the present invention to provide a lens control apparatus that supports high-precision, high-speed positioning of an image capture lens.

An embodiment of the present invention relates to a lens control apparatus. The lens control apparatus comprises: a lens; an actuator structured to position the lens; a Hall element structured to generate a position detection signal that indicates the position of the lens; a temperature detection unit structured to detect a temperature based on a voltage across the Hall element in a state in which a constant current is applied to the Hall element; and a control unit structured to control the actuator such that the position detection signal approaches a position instruction signal that indicates a target position of the lens.

With this embodiment, the temperature can be detected based on the change in an internal resistance of the Hall element, which is provided primarily as a position detector. Accordingly, such an embodiment does not require an additional temperature sensor, thereby allowing the required costs and circuit space to be reduced. Furthermore, such an embodiment is capable of detecting the temperature and the position based on the changes in voltages across the different terminals. This supports the temperature detection and the position detection in a parallel and/or continuous manner.

Also, the control unit may comprise a temperature compensation unit structured to correct a temperature dependence of a relation between the position detection signal and a corresponding actual position of the lens.

By using the temperature detected by means of the Hall element to correct the temperature characteristics of the Hall element itself, this provides high-precision temperature compensation.

Also, the control unit may further comprise a linearity compensation unit structured to correct a linearity of the relation.

By performing the temperature compensation and the linearity compensation in the position control operation for the lens, this provides high-precision and high-speed positioning.

Also, the relation may be acquired at a predetermined temperature. Also, the control unit may further comprise a memory structured to store information with respect to the relation. Also, the linearity may be corrected for a current temperature that differs from the predetermined temperature, based on the relation acquired at the predetermined temperature. Also, temperature compensation may be performed with a predetermined correction coefficient supplied according to a difference between the predetermined temperature and the current temperature.

This embodiment employs the relation between the position detection signal and the change in position of the lens acquired at a predetermined temperature, and the correction coefficient that corresponds to the difference between the predetermined temperature and the current temperature. Thus, such an embodiment requires only a small memory capacity and only a small amount of calculation to support both the temperature compensation and the linearity compensation.

Also, the relations may be acquired for multiple predetermined temperatures. Also, the control unit may further comprise a memory structured to store information with respect to the relations. Also, the linearity may be corrected for a current temperature that differs from the predetermined temperatures, based on the relation acquired for one from among the multiple temperatures that is closest to the current temperature. Also, temperature compensation may be performed such that the relation is represented by a straight line having a slope that is unrelated to the temperature.

This embodiment employs multiple relation expressions for the respective predetermined temperatures. This provides the temperature compensation and the linearity compensation with improved precision. Furthermore, this allows limitation of the number of predetermined temperature conditions for which the relation is to be measured beforehand. This allows the required memory capacity to be reduced.

Also, the relations may be acquired for multiple predetermined temperatures. Also, the control unit may further comprise a memory structured to store information with respect to the relations. Also, the relation may be generated for the current temperature based on the relations acquired for adjacent temperatures between which the current temperature is positioned, from among the multiple predetermined temperatures. Also, linearity compensation may be performed based on the relation thus generated. Also, temperature compensation may be performed such that the relation is represented by a straight line having a slope that is unrelated to the temperature.

This embodiment employs multiple relation expressions for the respective predetermined temperatures. This provides the temperature compensation and the linearity compensation with improved precision. Furthermore, this allows limitation of the number of predetermined temperature conditions for which the relation is to be measured beforehand. This allows the required memory capacity to be reduced.

Another embodiment of the present invention relates to an image capture apparatus. The image capture apparatus may comprise: any one of the lens control apparatuses; and an image sensor that is capable of performing phase difference detection in order to support an autofocus control operation. Temperature compensation and linearity compensation are employed in detection of the position of the lens in order to support an autofocus control operation.

Such an arrangement is capable of directly accessing the target focal position by means of phase difference detection based on the position detection signal subjected to the temperature compensation and the linearity compensation. This provides high-speed and high-precision lens positioning.

Yet another embodiment of the present invention also relates to an image capture apparatus. The image capture apparatus may comprise multiple camera modules. Also, each camera module may comprise any one of the aforementioned lens control apparatuses. Also, temperature compensation and linearity compensation may be employed in detection of the position of the lens in order to support an autofocus control operation for each camera module.

Such an arrangement is capable of driving the multiple lenses of the respective camera modules in an interlinked manner. Furthermore, the position detection signal is corrected for the change in temperature. This allows interlinking of the multiple camera modules in a state as if there was no change in temperature.

Yet another embodiment of the present invention relates to an actuator driver. The actuator driver comprises: a position detection unit structured to generate a position detection value that indicates the position of a control target, based on a Hall signal generated by a Hall element; a correction unit structured to correct the position detection value; a controller structured to generate a control instruction value such that the position detection value subjected to correction matches a position instruction value that indicates a target position of the control target; a driver unit structured to apply a driving signal that corresponds to the control instruction value to an actuator; and a temperature detection unit structured to generate a temperature detection value that indicates the temperature based on a voltage across the Hall element in a state in which a predetermined current is supplied to the Hall element.

With this embodiment, the temperature can be detected based on the change in the internal resistance of the Hall element, which is provided primarily as a position detector. Accordingly, such an embodiment does not require an additional temperature sensor, thereby allowing the required costs and circuit space to be reduced. Furthermore, such an embodiment is capable of detecting the temperature and the position based on the changes in voltages across the different terminals. This supports the temperature detection and the position detection in a parallel and/or continuous manner.

Also, the correction unit may be structured to correct the position detection value such that the relation between the position detection value and an actual position exhibits a linearity that is uniform independent of the temperature.

With this embodiment, by performing the temperature compensation and the linearity compensation in the position control operation for the control target, this provides high-precision and high-speed positioning.

Also, the position detection value may be corrected such that the relation between the position detection value and an actual position is uniform regardless of the temperature in a range in the vicinity of the position of the control target that corresponds to a predetermined position detection value.

Also, with the position detection value or otherwise the position instruction value as y, with the actual position as x, and with the relation between x and y as an x-y characteristic, the correction unit may comprise memory structured to store data that represents the x-y characteristic $y=a*x+b$ generated in the form of a linear function to be used as a calculation target, data that represents a function $x=f(y)$ obtained by means of a polynomial approximation of the x-y characteristic measured beforehand at a predetermined temperature, and correction coefficients c and d (d may be set to zero) acquired for each of multiple temperatures. Also, the correction unit may be structured to perform an operation comprising: calculating $x_1=f(y_1)$ with the position detection value received from the position detection unit as $y_1$; calculating $y_2=a*x_1+b$; determining the coefficients c and d that correspond to the temperature indicated by the temperature detection value; and calculating $y_3=c*y_2+d$. Also, $y_3$ may be employed as the position detection value subjected to correction.

Also, the function $x=y(y)$ may be divided into multiple sections. Also, the function may be approximated for each section in the form of a linear function.

This allows the calculation time and the memory capacity required for intermediate calculation to be reduced as compared with an arrangement in which the relation is approximated over the overall range by means of a single common higher-order function.

In a step for determining the coefficients c and d that correspond to the temperature (detection temperature) indicated by the temperature detection value, (i) the correction coefficients defined for a temperature that is closest to the detection temperature may be selected. Also, (ii) the correction coefficients may be derived by means of calculation such as interpolation, averaging, or the like, based on the correction coefficients defined for two temperatures between which the detection temperature is positioned.

Also, with the position detection value or otherwise the position instruction value as y, with the actual position as x, and with the relation between x and y as an x-y characteristic, the correction unit may comprise memory structured to store data that represents the x-y characteristic $y=a*x+b$ generated in the form of a linear function to be used as a calculation target, and data that represents a function $x=f_0(y)$, $x=f_1(y)$, and the like, obtained by means of a polynomial approximation of x-y characteristics measured beforehand at multiple predetermined temperatures $T_0$, $T_1$, and the like. Also, the correction unit may be structured to perform an operation comprising: determining a function $x=f'(y)$ that corresponds to the temperature indicated by the temperature detection value; calculating $x_1=f'(y_1)$ with the position detection value received from the position detection unit as $y_1$; and calculating $y_2=a*x_1+b$. Also, $y_2$ may be employed as the position detection value subjected to correction.

Also, the function $x=y'(y)$ may be divided into multiple sections. Also, the function may be approximated for each section in the form of a linear function.

This allows the calculation time and the memory capacity required for intermediate calculation to be reduced as compared with an arrangement in which the relation is approximated over the overall range by means of a single common higher-order function.

In a step for determining the function $x=f'(y)$ that corresponds to the temperature (detection temperature) indicated by the temperature detection value, (i) a function defined for a temperature that is closest to the detection temperature may be selected. Also, (ii) such a function may be derived by means of calculation such as interpolation, averaging, or the like, based on the functions defined for two temperatures between which the detection temperature is positioned.

Also, the actuator may be monolithically integrated on a single semiconductor substrate.

Yet another embodiment of the present invention relates to a lens control apparatus. The lens control apparatus may comprise: a lens; an actuator comprising a movable portion on which the lens is mounted; and any one of the aforementioned actuator drivers structured to drive the actuator.

Yet another embodiment of the present invention relates to an image capture apparatus. The image capture apparatus may comprise: an image sensor; and the aforementioned lens control apparatus.

It should be noted that any combination of the aforementioned components, any component of the present invention, or any manifestation thereof, may be mutually substituted between a method, apparatus, system, and so forth, which are also effective as an embodiment of the present invention.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
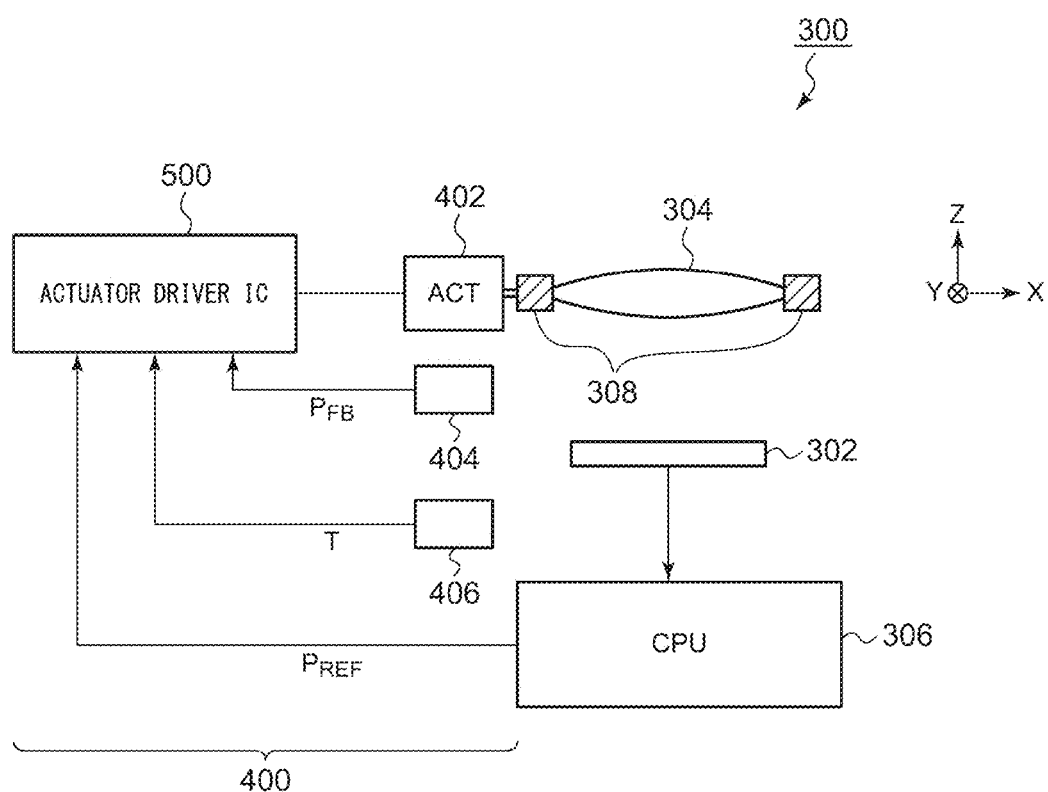
FIG. 1 is a diagram showing an image capture apparatus.

The invention will now be described based on preferred embodiments which do not intend to limit the scope of the present invention but exemplify the invention. All of the features and the combinations thereof described in the embodiment are not necessarily essential to the invention.

In some cases, the sizes (thickness, length, width, and the like) of each component shown in the drawings are expanded or reduced as appropriate for ease of understanding. The size relation between multiple components in the drawings does not necessarily match the actual size relation between them. That is to say, even in a case in which a given member A has a thickness that is larger than that of another member B in the drawings, in some cases, in actuality, the member A has a thickness that is smaller than that of the member B.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Description will be made in the present embodiment regarding an actuator driver that drives an actuator that performs positioning of a lens. First, brief description will be made regarding a configuration of an actuator that moves an image capture lens. FIG. 1 is a diagram showing an image capture apparatus. An image capture apparatus 300 is configured as a camera module built into a digital still camera, digital video camera, smartphone, or a tablet terminal. An image capture apparatus 300 includes an image sensor 302, a lens 304, a processor 306, and a lens control apparatus 400. The lens 304 is arranged on an optical axis of light to be input to the image sensor 302. For example, the lens 304 may be an autofocus (AF) lens or an image stabilization lens. The lens control apparatus 400 performs positioning of the lens 304 based on a position instruction value (which will also be referred to as a "target code") $P_{REF}$ received from the processor 306.

For example, in a case in which the lens 304 is configured as an AF lens, the lens control apparatus 400 is configured to change the position of the lens 304 in the optical axis direction (Z direction). The processor 306 generates the position instruction value $P_{REF}$ such that the captured image has high contrast (contrast AF). Alternatively, the position instruction value $P_{REF}$ may be generated based on the output of an AF sensor provided as an external component of the image sensor 302 or otherwise an AF sensor embedded in an image capture face (phase difference AF).

In a case in which the lens 304 is configured as an image stabilization lens, the lens control apparatus 400 changes the position of the lens 304 in the X-axis direction and/or in the Y-axis direction in a plane defined in parallel with the image sensor 302. The processor 306 generates the position instruction value $P_{REF}$ based on the output from a gyro sensor.

Description will be made below assuming that the lens 304 is configured as an AF lens.

The lens control apparatus 400 controls the actuator 402 by means of a position feedback control operation. Specifically, the lens control apparatus 400 includes an actuator 402, a position detector 404, a temperature detector 406, and an actuator driver IC (Integrated Circuit) 500. The actuator 402 is configured as a voice coil motor, for example. A movable portion of the voice coil motor is coupled to a holder 308 for the lens 304. A stationary portion of the voice coil motor is fixedly mounted on a housing of the image capture apparatus 300.

In many cases, the position detector 404 employs a magnetic detection means such as a Hall element or the like. Description will be made below assuming that such a Hall element is employed. A permanent magnet is mounted on the movable portion of the voice coil motor. A Hall element is mounted on the stationary portion thereof. When a relative change occurs in the positions of the movable portion and the stationary portion, the magnetic flux input to the Hall element changes. The Hall element generates an electric signal (which will be referred to as the "position detection signal $P_{FB}$" hereafter) that corresponds to the change in the input magnetic flux, i.e., the change in position of the actuator 402, and in other words, the current position of the lens 304. The position detection signal $P_{FB}$ is fed back to the actuator driver IC 500.

The actuator driver IC 500 is configured as a function IC integrated on a single semiconductor substrate. Examples of such an "integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit on a single chip, such an arrangement allows the circuit area to be reduced, and allows the circuit elements to have uniform characteristics.

The actuator driver IC 500 feedback controls the actuator 402 such that the position detection signal $P_{FB}$ thus fed back matches the position instruction value $P_{REF}$.

As described above, the position of the lens 304 is detected and used as feedback data for the position control operation. This suppresses transient oscillation in the step response, thereby providing high-speed settling. Also, this provides high-speed access to the target position.

Ideally, such an arrangement preferably has a relation (which will be referred to as the "x-y characteristic" hereafter) having linearity with no irregularities and no variation regardless of changes in temperature or the like, between the actual position of the lens 304 (actuator 402) (which will be referred to as a "variable x" hereafter) and the output of the position detector 404 (i.e., the position detection signal $P_{FB}$) or otherwise the corresponding position instruction value $P_{REF}$ (which will also be referred to as a "variable y" hereafter). However, in actuality, the x-y characteristic is a nonlinear relation. Furthermore, the x-y characteristic varies for every image capture apparatus 300. Moreover, such a relation (x-y characteristic) varies due to the temperature of the position detector 404. Accordingly, in a case in which this relation (x-y characteristic) varies, the actual position of the lens 304 deviates even if the control operation is performed such that the position detection signal $P_{FB}$ matches the position instruction value $P_{REF}$.

The actuator driver IC 500 has a function of correcting the x-y characteristic as described later in detail. In order to support such a correction function, the temperature detector 406 is provided. The temperature detector 406 detects the temperature of the position detector 404. It should be noted that, in a case in which the temperature of the position detector 404 matches the surrounding temperature, or otherwise, in a case in which there is a strong correlation between them, the temperature detector 406 may measure the surrounding temperature. The temperature information T thus detected is input to the actuator driver IC 500. The actuator driver IC 500 corrects the driving control operation of the actuator 402 based on the temperature information T. The temperature detector 406 may be a thermistor, posistor, thermocouple, or the like. Alternatively, in a case in which the position detector 404, for which the temperature detection is to be performed, is configured as a Hall element, the Hall element itself may be employed as the temperature detector 406.

Most strictly, the following flow provides a control operation without individual variation and without variation due to temperature.

1. Before shipping, the relation (x-y characteristic) between the position detection signal y and the actual position x is measured for each of multiple temperatures.
2. The change in position (or position) that corresponds to the position detection signal is acquired with reference to one relation that corresponds to the current temperature from among the multiple relations measured beforehand.

However, such a flow requires an enormous amount of detection time before shipping. Furthermore, it is necessary to hold, in an internal component of the actuator driver IC, the x-y characteristics for multiple respective temperatures. Accordingly, such an arrangement requires large-capacity memory. In particular, in a case in which the x-y characteristics exhibit a non-linear relation, this problem becomes serious.

Description will be made below with reference to the first embodiment through the third embodiment regarding a correction operation that requires only a small memory capacity to allow a control operation to be performed while suppressing individual variation and variation due to temperature. The correction operation that will be described below can be roughly classified into two compensation operations. That is to say, one is linearity compensation that provides a linear relation between the position detection signal (position instruction value) and the actual position, and the other is temperature compensation that corrects variation due to temperature.

First Embodiment

Figure 2:
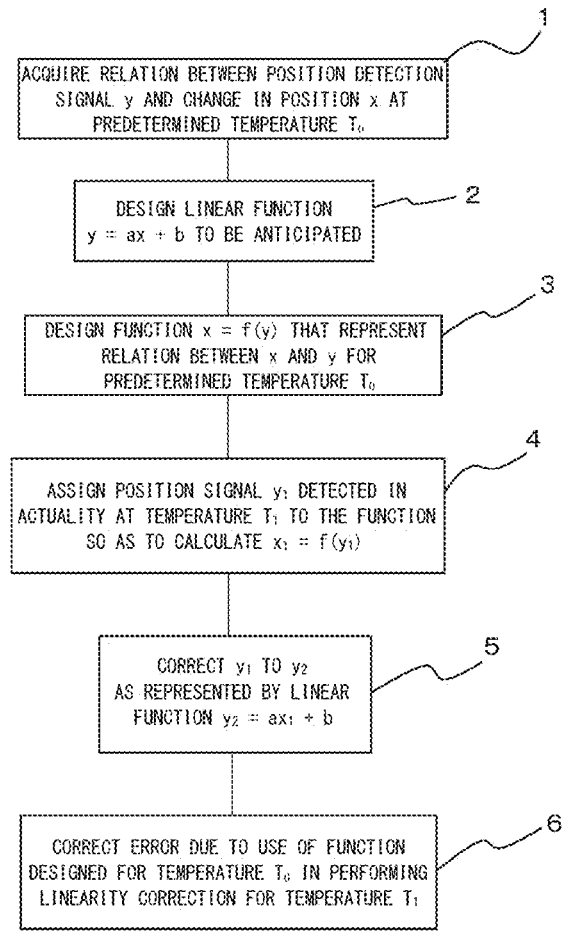
FIG. 2 is a flowchart showing operations for temperature compensation and linearity compensation employed in a lens control apparatus according to a first embodiment of the present invention.
Figure 3:
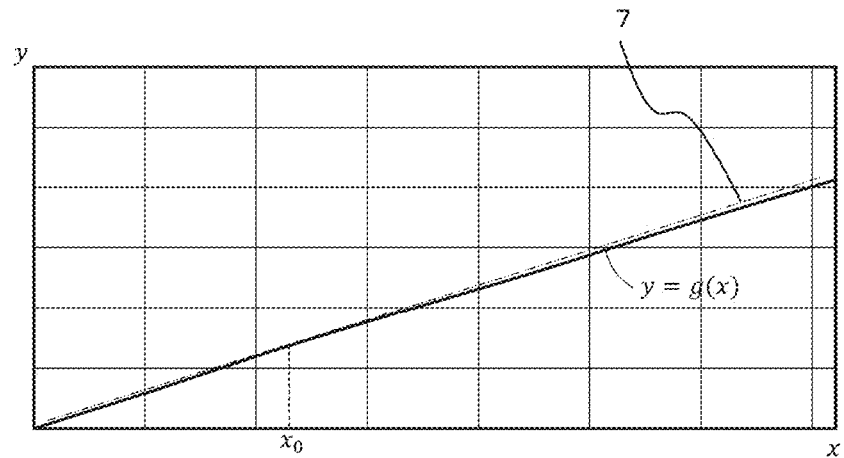
FIG. 3 is a diagram for explaining a method for calculating the slope that represents the relation between the position detection signal and the change in position, which is required to perform the linearity compensation.
Figure 4:
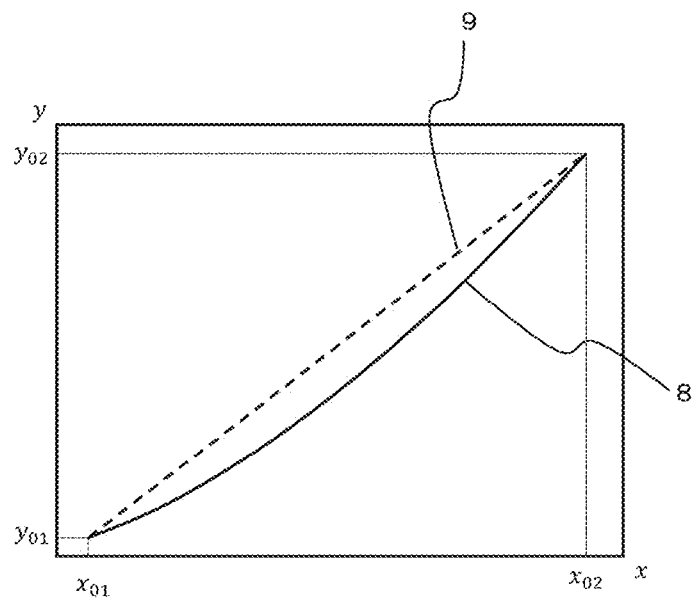
FIG. 4 is a diagram for explaining a method for calculating the slope and the offset that represent the relation between the position detection signal and the change in position, which is required to perform the linearity compensation.
Figure 5:
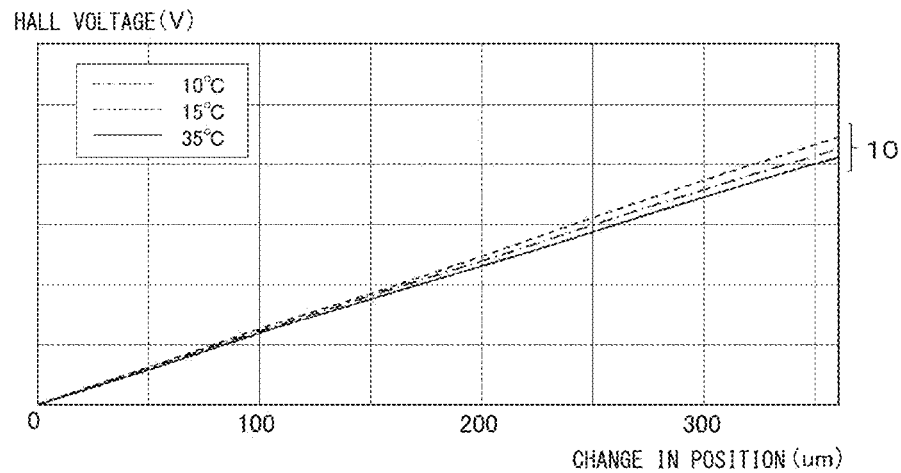
FIG. 5 is a diagram showing measurement results for explaining the change in the relation between the position detection signal and the change in position due to temperature.
Figure 6:
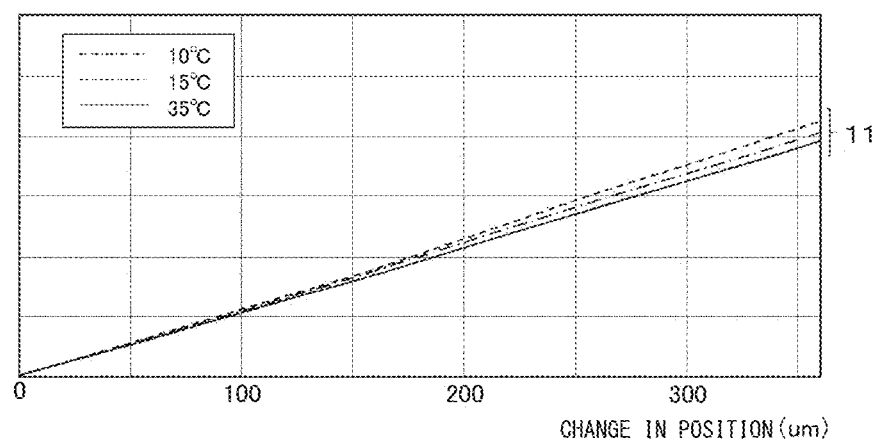
FIG. 6 is a diagram showing the results obtained by performing the linearity compensation for the measurement results of the relations between the position detection signal and the change in position acquired for respective temperatures shown in FIG. 5.
Figure 7:
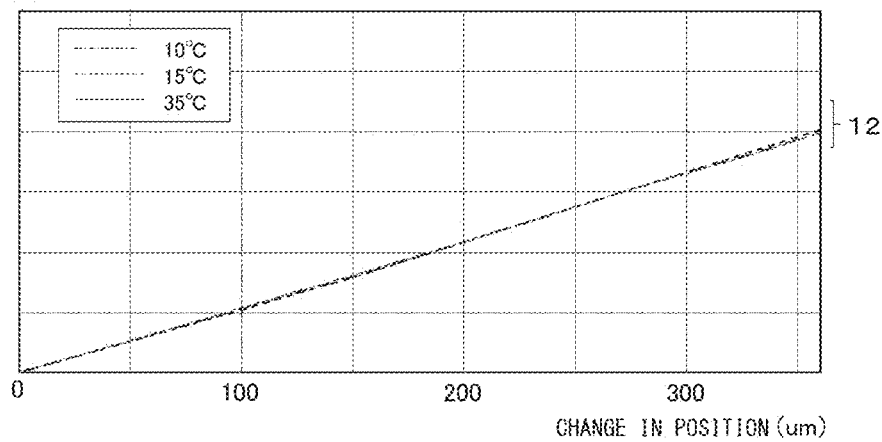
FIG. 7 is a diagram showing the results obtained by further performing the temperature compensation for the results subjected to the linearity compensation shown in FIG. 6.
Figure 8:
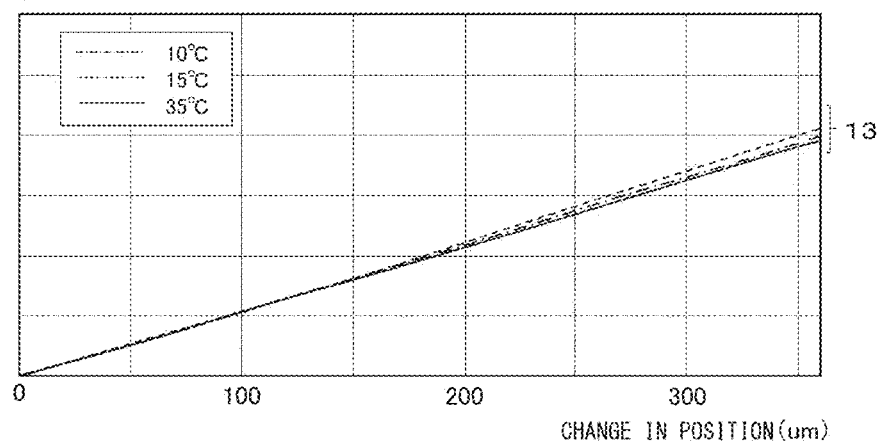
FIG. 8 is a diagram showing the results obtained by performing the temperature compensation using an average value of optimum correction coefficients defined for respective multiple lens control apparatuses as a common correction coefficient instead of the correction coefficient employed in the temperature compensation shown in FIG. 7.
Figure 9:
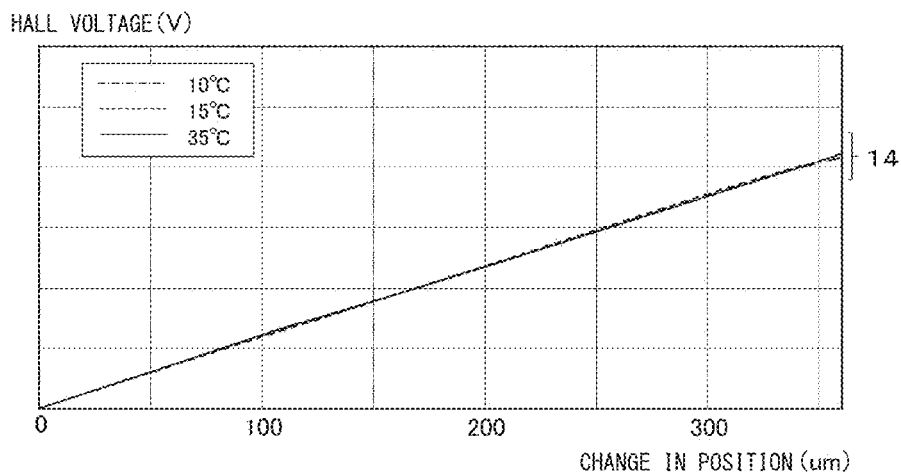
FIG. 9 is a diagram showing the results obtained by performing the temperature compensation by means of slope correction before performing the linearity compensation.

Description will be made with reference to FIG. 2 through FIG. 9 regarding the first embodiment of the present invention. FIG. 2 is a flowchart showing a temperature compensation operation and a linearity compensation operation employed in the first embodiment of the lens control apparatus according to the present invention. FIG. 3 is a diagram for explaining a method for calculating the slope that represents the relation between the position detection signal and the change in position, which is required for the linearity compensation. FIG. 4 is a diagram for explaining a method for calculating the slope and the offset that represent the relation between the position detection signal and the change in position, which is required for the linearity compensation. FIG. 5 shows measurement results for explaining the change in the relation between the position detection signal and the change in position due to temperature. FIG. 6 is a diagram showing results of the linearity compensation performed for the measurement results of the relations between the position detection signal and the change in position for the respective temperatures in FIG. 5. FIG. 7 is a diagram showing the results of the temperature compensation further performed for the results obtained by the linearity compensation shown in FIG. 6. FIG. 8 is a diagram showing the results of the temperature compensation using the average of optimum correction coefficients designed for the respective multiple lens control apparatuses as a correction coefficient, instead of the correction coefficients employed in the temperature compensation shown in FIG. 7. FIG. 9 is a diagram showing the results of temperature compensation by means of slope correction before the linearity compensation is performed.

Description will be made with reference to FIG. 2 regarding the overall operation of the linearity compensation and the temperature compensation. In the first embodiment, the linearity compensation is performed for each temperature using the relation between the position detection signal and the change in position at a single predetermined temperature.

The operations 1 through 3 are performed in an inspection step before shipping after the image capture apparatus 300 is manufactured. In the operation 1, the relation (x-y characteristic) between the position detection signal y (position detection value $P_{FB}$ shown in FIG. 1) and the change in position x at a predetermined temperature (which will also be referred to as the "reference temperature") $T_0$, e.g., the set temperature of the manufacturing factory. The position detection signal y may be an output voltage of the Hall element. In a case in which the measurement is performed while driving a servo motor, the position detection signal y may be a target code (position instruction value $P_{REF}$ shown in FIG. 1). The reason is as follows. That is to say, the target code is a code that indicates the position of the target to be accessed. After the position is settled to the target position by means of the servo motor, the target code is equivalent to the output voltage of the Hall element. The change in position x may be directly measured as the change in position of the image capture lens by means of a laser displacement meter or the like. The relation between the position detection signal y and the change in position x thus measured does not necessarily exhibit linearity. Furthermore, it is conceivable that the relation would change due to a change in the temperature from $T_0$. The operation 1 is performed for all individual products.

In the operation 2, a linear function y=a*x+b is designed. The slope "a" and the intercept "b" are preferably designed giving consideration to the x-y characteristic obtained in the operation 1. For example, by performing linear approximation of the x-y characteristic, the slope "a" and the intercept "b" may be derived. It should be noted that such a linear function y=a*x+b may be designed independently of the x-y characteristic at the reference temperature $T_0$.

In a case in which zero-point adjustment is performed in the measurement, the x-y characteristic in the measurement result passes through the origin, i.e., b=0. Thus, such an arrangement requires only the slope "a" to be derived. For example, as shown in FIG. 3, the measurement result is represented in the form of a function y=g(x). After the function g(x) is differentiated, the slope of the function at a position $x_0$ in the vicinity of the center of the stroke can be calculated as represented by a=g'($x_0$). That is to say, the function y=a*x is designed as a linear function 7 having the slope a and passing through the origin. On the other hand, in a case in which the measurement result is represented by a linear function that does not pass through the origin, an offset calculation (b≠0) may be performed so as to shift the measurement result such that it can be represented by a linear function that passes through the origin. Also, as shown in FIG. 4, the function y=a*x+b may be designed as represented by a linear function 9 that passes through two desired positions of the measurement result 8, e.g., both ends of the practical stroke range, and specifically, ($x_{01}$, $y_{01}$) and ($x_{02}$, $y_{02}$).

In the operation 3, the relation between the position detection signal y and the change in position x (x-y characteristic) measured in the operation 1 is represented in the form of a function. In an actual machine such as a cellular phone, y represents a measurement value. Accordingly, a function such as x=f(y) is designed with y as a variable, so as to represent the measurement result. In order to fit a nonlinear relation, the function is required to have a second order or more (polynomial approximation). As the polynomial order is raised, the fitting error becomes smaller. However, this involves an increase in the calculation amount. Accordingly, the order may preferably be designed according to the actual conditions. Description will be made below regarding linearity compensation employing a fifth-order function.

$$x = y(y) = k_0 + (k_1 * y) + (k_2 * y^2) + (k_3 * y^3) + (k_4 * y^4) + (k_5 * y^5) \quad (1)$$

The operations 4 through 6 are performed in an actual operation of the actuator driver IC 500. Description will be made below with the position detection signal y acquired from the position detector 404 in the actual operation as $y_1$.

In the operation 4, the position detection signal $y_1$ detected in the actual measurement is assigned to the function expression (1) so as to acquire the calculated change in position $x_1$. The change in position $x_1$ is a tentative value.

$$x_1 = f(y_1)$$

In a case in which the surrounding temperature is equal to $T_0$, it is assumed that the measurement result matches the factory measurement result. In a case in which the surrounding temperature $T_1$ is different from $T_0$, the function x=f(y) derived for To is also employed. It should be noted that the temperature $T_1$ may be detected by means of a temperature sensor such as a thermistor, thermocouple, or the like. Also, as described later, the change in temperature may be detected based on the change in the resistance value of the Hall element that occurs due to the change in temperature. In this case, such an arrangement does not require an increase in the number of components to detect the temperature of such an element itself for which the temperature is to be detected.

In the operation 5, $x_1$ obtained in the operation 4 is assigned to the function y=a*x+b designed in the operation 2, so as to calculate $y_2$=a*$x_1$+b. This corrects the measurement value $y_1$ to $y_2$, thereby providing linearity compensation. In this linearity compensation, even in a case of the temperature $T_1$, the expression designed for the temperature $T_0$ is employed. This leads to error due to the difference between the temperatures $T_0$ and $T_1$.

In the operation 6, the temperature compensation is performed so as to correct the aforementioned error. Specifically, temperature dependence of the slope and the offset that represents a linear function is corrected as represented by $y_3$=c*$y_2$+d. The coefficients c and d are parameters determined beforehand for each temperature. It is not necessary to acquire the coefficients c and d for each individual product. Before the inspection step, preferably, the values may be appropriately determined based on a small number of typical samples (products). In a case in which the relation expression passes through the origin (i.e., b=0), this requires only slope correction. That is to say, the operation may be performed assuming that d=0.

As described above, by performing both the linearity compensation and the temperature compensation, this provides a constant relation having linearity between the position detection signal and the change in position regardless of the temperature. In a state in which the position provided by the servo motor has settled, the position detection signal is equal to the position instruction value. Thus, the relation between the position instruction value and the change in position is maintained as a linear and stable relation regardless of temperature or individual variation. That is to say, when a given position instruction value $P_{REF}$ is input, this allows the processor 306 to change the position of the lens 304 to the same position regardless of temperature and variation.

Specific description will be made with reference to the graphs in FIG. 5 through FIG. 8 regarding the measurement results and correction examples.

FIG. 5 shows an example of actual measurement results of the relations between the position detection signal $y_1$ and the change in position x. The graphs 10 respectively represent the measurement results at the temperatures 10° C., 15° C., and 35° C. From among the three temperatures, two temperatures involve the largest change in the measurement results. The remaining one involves an intermediate change in the measurement results, which is selected as a typical temperature. The vertical axis values for each graph vary depending on the gain of the Hall amplifier and depending on whether the values represent the output of the Hall element or the target code. Accordingly, absolute values are meaningless even assuming that the measurement results represented by the graphs are acquired under the same conditions. Thus, the values on the vertical axis are not shown. Each graph 10 is close to a linear function. In actuality, each graph 10 is curved. Furthermore, the curve of each graph has a slope that changes due to temperature.

FIG. 6 shows graphs showing the results obtained by performing the linearity compensation (operations 4 and 5) for the results shown in FIG. 5. The function reference temperature $T_0$ is 25° C., which is not shown in the drawing. A fifth-order expression is designed so as to represent the relation between the position detection signal y and the change in position x measured at 25° C. As a result, the function x=f(y) is obtained. Next, the values of the position detection signal are input to the function x=y(y) for each temperature. Furthermore, linearity correction is performed using the function f=a*x. Here, "a" represents a slope determined beforehand. Specifically, the slope "a" is defined as a slope that represents the relation between the position detection signal and the change in position at a temperature of 25° C., which is derived in the vicinity of an intermediate position of the change in position. As represented by the graphs 11, the result for each temperature can be corrected and approximated as represented by an approximately linear function. However, linearity compensation is performed for all the temperatures by means of a single function designed for 25° C. This leads to error due to this function. As a result, there is a difference in the slope between the temperatures.

FIG. 7 shows the results obtained by performing temperature slope compensation for the results shown in FIG. 6 with the slope correction coefficients designed for respective temperatures. Specifically, the correction coefficient is designed for each temperature such that the calculation result matches the linear function having a slope designed for the reference temperature $T_0$, i.e., 25° C. The correction coefficient designed for each temperature corresponds to the coefficient "c" in the operation 6 shown in FIG. 2.

For example, description will be made with the slope for 25° C. as $\alpha_{25° C.}$, with the slope for 10° C. as $\alpha_{10° C.}$, with the slope for 15° C. as $\alpha_{15° C.}$, and with the slope for 35° C. as $\alpha_{35° C.}$. In a case in which the graph data for 10° C. is multiplied by $\alpha_{25° C.}/\alpha_{10° C.}$, the calculation result matches the graph data for 25° C. Similarly, in a case in which the graph data for 15° C. is multiplied by $\alpha_{25° C.}/\alpha_{15° C.}$, the calculation result matches the graph data for 25° C. In a case in which the graph data for 15° C. is multiplied by $\alpha_{25° C.}/\alpha_{15° C.}$, the calculation result matches the graph data for 25° C. In a case in which the graph data for 35° C. is multiplied by $\alpha_{25° C.}/\alpha_{35° C.}$, the calculation result matches the graph data for 25° C.

Accordingly, in the operation 6 shown in FIG. 2, the correction coefficient $c_{10° C.}$ for the temperature 10° C. is defined as $\alpha_{25° C.}/\alpha_{10° C.}$. Similarly, the correction coefficient $c_{15° C.}$ for the temperature 15° C. is defined as $\alpha_{25° C.}/\alpha_{10° C.}$. Furthermore, the correction coefficient $c_{35° C.}$ for the temperature 35° C. is defined as $\alpha_{35° C.}/\alpha_{10° C.}$.

The correction coefficients $c_{10° C.}$, $c_{15° C.}$, $c_{35° C.}$ thus obtained may preferably be stored in the form of a table in memory included in the lens control apparatus. When the detected temperature obtained by a temperature detection means is an intermediate temperature between two adjacent temperatures defined in the table (10, 15, and 35° C. in this example), an average of the two correction coefficients defined for the two adjacent temperatures between which the detected temperature is positioned may be employed. Also, the correction coefficient may be calculated by means of linear interpolation. Also, such correction coefficients may be held in the form of a function of the temperature. As shown by the graphs 12, the results subjected to the linearity compensation and the temperature compensation are aligned along almost a single straight line regardless of the temperature. This means that, in the actual operation of the actuator driver IC 500, the position detection signal $y_3$ obtained in the operation 6 indicates the actual position x with high precision.

As viewed from the processor 306, the relation between the position detection value $P_{REF}(y)$ and the actual position x of the lens x always satisfies the relation expression y=a*x+b. This provides the overall system with high-precision and high-speed positioning of the lens 304.

FIG. 7 shows an example in which the correction coefficients c for the respective temperatures are designed such that they are optimum corrections for a small number of representative samples measured in actuality. However, each correction coefficient varies due to individual variation. Accordingly, the optimum correction is not necessarily obtained using the same correction coefficient. In order to solve such a problem, an optimum correction coefficient may be designed beforehand for each individual product. However, this requires temperature characteristics measurement for every individual product, which leads to reduced productivity. In a case in which such individual variation is non-negligible, the correction coefficient distribution may be calculated based on measurement results for multiple individual products, and specifically, an average thereof may be employed as a set value for the correction coefficient, for example. FIG. 8 shows the results in a case in which slope correction is performed using such an average value of the correction coefficients. In this case, as shown in graph 13, correction error occurs in the slope due to individual variation of the correction coefficient. However, even in this case, such an arrangement provides reduced correction error as compared with a case in which no slope correction is performed (FIG. 6).

It should be noted that the flow shown in FIG. 2 is nothing more than an example. That is to say, the present invention is by no means restricted to such an example. Also, the order of the operations may be changed. For example, first, the slope correction may be performed for each temperature, which provides constant correction values represented by a function having a non-linear component regardless of the temperature. Subsequently, a linearity operation may be performed using a single function. FIG. 9 shows the results obtained by performing the slope correction for each temperature before the linearity compensation is performed. This provides the correction results represented by a function having a remaining non-linear component. However, the correction results are represented by almost a single curve regardless of the temperature. That is to say, the results represented by such a single curve are subjected to the linearity compensation using a single function. This allows the linearity compensation to involve almost no function error. Thus, as indicated by the graphs 14, after the linearity compensation, the results are represented by almost a single straight line. As described in this example, in a case in which such samples have relatively high linearity, there is almost no difference in the correction result between the aforementioned two methods.

It should be noted that it is difficult to derive an optimum slope correction value and an offset correction value for the characteristics represented by such a curve before the linearity compensation. In other words, as shown in FIG. 2, first, the linearity compensation is preferably performed. Furthermore, offset correction is preferably performed in the linearity compensation (such that the calculated results pass through the origin, i.e., such that b=0 holds true). After the linearity compensation, only the slope correction is preferably performed (assuming that d=0). This enables high-precision correction. Furthermore, this facilitates calculation of correction coefficients. Also, in some cases, the calculation results cannot be represented by a single curve regardless of the temperature even if the slope correction is performed for each temperature, and even if, in addition, the offset correction is performed for each temperature. In such cases, in a case of performing the linearity compensation after the temperature compensation, there is a difference in the slope of the linear function between the temperatures. Accordingly, such an arrangement requires additional slope correction to be performed. In such cases, the temperature correction is preferably performed after the linearity compensation, which facilitates the correction operation.

Second Embodiment

Figure 10:
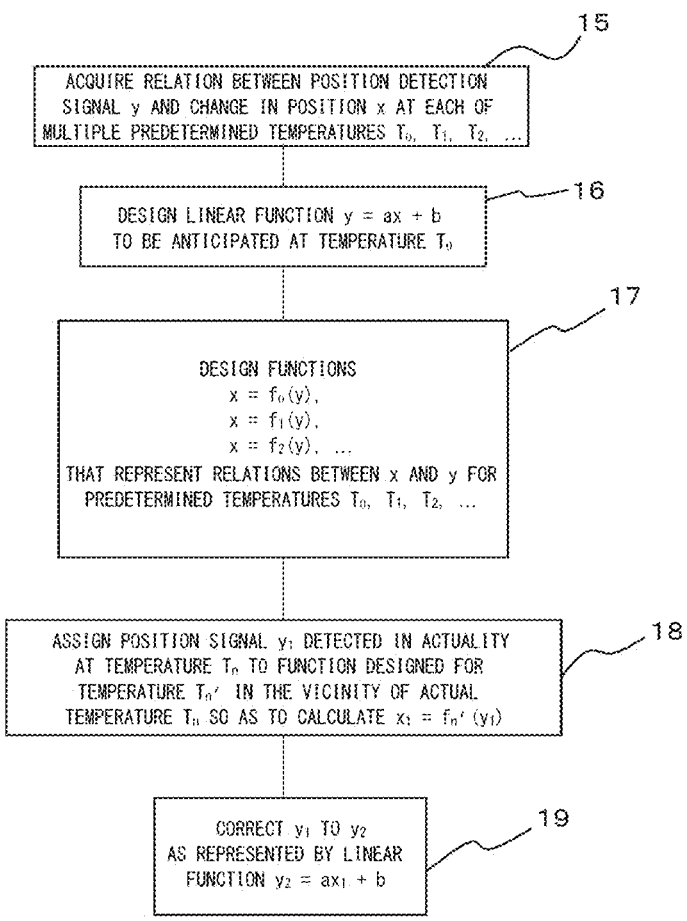
FIG. 10 is a flowchart showing the operations for the temperature compensation and the linearity compensation employed in the lens control apparatus according to a second embodiment of the present invention.
Figure 11:
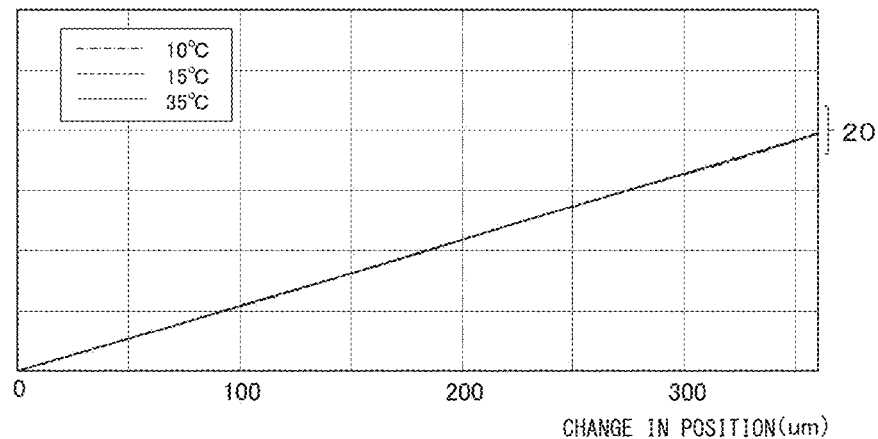
FIG. 11 is a diagram showing the results obtained by performing the linearity compensation for the measurement results acquired for multiple temperatures based on the relation between the position detection signal and the change in position acquired for the respective temperatures shown in FIG. 5, and by performing the temperature compensation such that the slope does not change due to temperature.

Description will be made with reference to FIG. 10 through FIG. 14 regarding a second embodiment of the present invention. FIG. 10 is a flowchart showing temperature compensation and linearity compensation operations of the lens control apparatus according to the second embodiment of the present invention. FIG. 11 shows the results obtained by performing linearity compensation for the measurement results for the respective temperatures based on the relation between the position detection signal and the change in position for each temperature shown as the results in FIG. 5, and by performing temperature compensation such that there is no difference in the slope between the temperatures.

The major difference in the flow between FIG. 10 and FIG. 2 is that, in FIG. 10, multiple functions are prepared based on the measurement results under the respective multiple temperatures, and employed as a function used for the linearity compensation. This allows the linearity compensation to be performed using a function that represents the characteristics at the actual temperature or otherwise the characteristics at a temperature that is in the vicinity of the actual temperature. This allows the linearity compensation to involve reduced function error, thereby providing reduced correction error.

In the operation 15, the relation between the position detection signal y and the change in position x is acquired for each of multiple predetermined temperatures $T_0$, $T_1$, $T_2$, etc. As the number of setting temperature conditions becomes large, function error due to deviation from the actual temperature can be reduced, which provides improved correction precision. However, this involves an increased number of additional temperature measurement steps to be performed beforehand. Accordingly, the number of temperature conditions may be determined giving consideration to a tradeoff between the requested precision and the costs required for such additional steps.

In the operation 16, a linear function $y=a*x+b$ to be employed in the linearity compensation is designed. That is to say, the slope "a" and the intercept "b" are determined. In a case in which zero-point adjustment is performed in the measurement, the measurement result passes through the origin, i.e., b=0. Thus, in this case, only the slope "a" may be derived. Here, description will be made regarding an arrangement in which the measurement results have the characteristics of passing through the origin as described in the first embodiment. The slope "a" at the representative temperature $T_0$ is acquired. The same slope is employed regardless the temperature. This provides temperature compensation at the same time as the linearity compensation.

In the operation 17, a function that represents the relation between the measured position detection signal y and the change in position x is derived. In an actual machine such as a cellular phone, y represents a measurement value. Accordingly, a function such as x=f(y) is designed with y as a variable. In order to fit a nonlinear relation with such a function, the function is required to have a second order or more. As the order is raised, the fitting error becomes smaller. However, this involves an increase in the calculation amount. Accordingly, the order may preferably be designed according to the actual conditions. In the linearity compensation described below, a fifth-order function is employed. Such a function is designed for each of the measurement results obtained beforehand for the respective temperatures.

In the operation 18, the position detection signal $y_1$ detected in actuality is assigned to such a function so as to obtain the calculated change in position $x_1$. When the surrounding temperature matches any one of the temperatures $T_0$, $T_1$, $T_2$, and the like, the function designed for the same temperature is used. In a case in which such a function is not prepared for the same temperature, the function designed for the closest temperature condition is used. Alternatively, an additional function may be generated by performing interpolation based on a pair of functions designed for the adjacent temperatures between which the actual temperature is positioned. In this case, it is difficult to generate a complicated function. Accordingly, such an additional function may be generated to have a slope obtained by averaging the slopes of the pair of functions.

In the operation 19, $x_1$ thus obtained in the operation 18 is substituted into the function $y=a*x+b$ designed in the operation 16, thereby obtaining $y_2=a*x_1+b$. Thus, the measurement value $y_1$ is corrected to $y_2$, thereby providing linearity compensation. In the embodiment 1, after the linearity compensation, the slope correction is performed as the temperature compensation. In contrast, by employing the function designed for each temperature, this allows the function error to be reduced. Furthermore, linearity compensation is performed employing the single slope "a" thus designed. This means that the slope correction is also performed at the same time in the linearity compensation. It should be noted that, in a case in which such optimum function data cannot be prepared, and accordingly, in a case in which the function error is non-negligible, the slope correction may further be performed.

FIG. 11 shows graphs of the results obtained by performing the linearity compensation for the results shown in FIG. 5. The reference temperature values for which the aforementioned function is designed are the same as the respective temperatures, i.e., 10° C., 15° C., and 35° C. The function is designed in the form of a fifth-order expression so as to represent the relation between the position detection signal y and the change in position x measured at each of the aforementioned temperatures. As a result, the function x=y (y) is derived for each temperature. Next, the values of the position detection signal are input to the function for each temperature. Furthermore, linearity correction results are calculated based on the linear function y=a*x using the predetermined slope "a". The linearity compensation is performed using the same slope "a" regardless of the temperature. This also provides the slope correction at the same time as the linearity compensation. The results represented by the graphs 20 are represented by an almost single straight line regardless of the temperature. This allows the correction error to be further reduced as compared with the results shown in FIG. 7. Because the linearity compensation is performed after the aforementioned function designed for the same temperature as the actual temperature is applied, it is natural for the result to be a clean straight line. In actuality, there is a certain degree of difference between the actual temperature and the temperature condition under which the aforementioned function is designed, leading to an increase in the correction error. In a case in which improving the precision of the linearity compensation and the temperature compensation involves acceptable time and effort, the characteristics may preferably be prepared in the form of a database under as many temperature conditions as possible.

Figure 12:
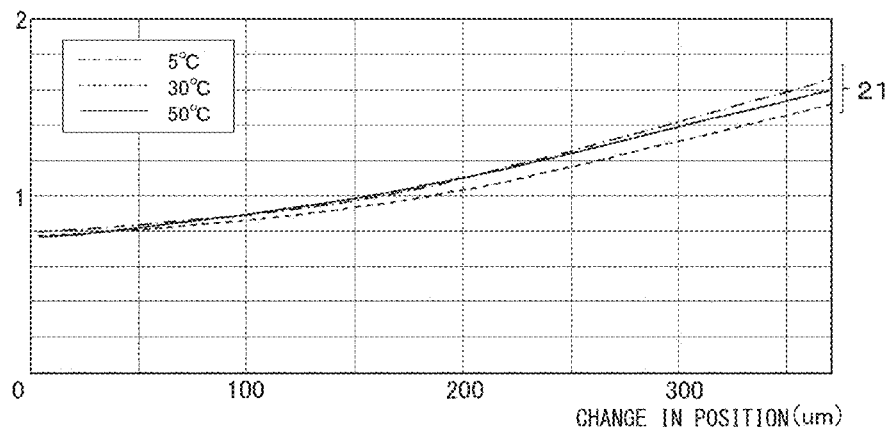
FIG. 12 is a diagram showing the measurement results for explaining the change in the relation between the position detection signal and the change in position due to temperature, in a lens control apparatus having a relation that is different from that shown in FIG. 5.
Figure 13:
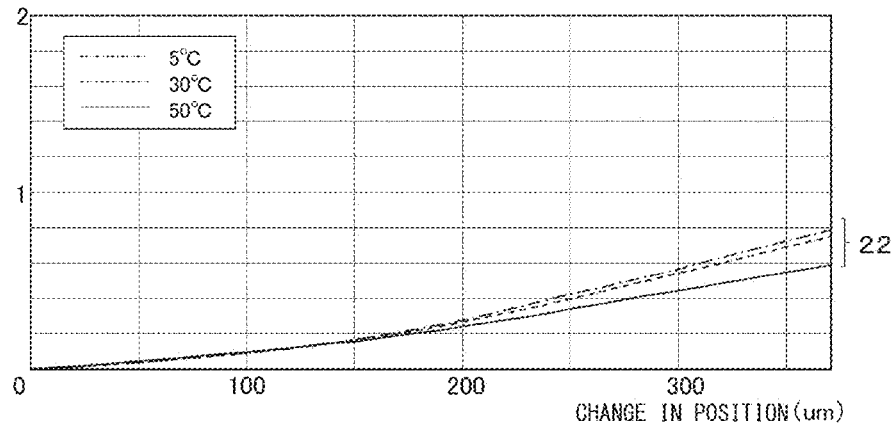
FIG. 13 is a diagram showing the results obtained by performing slope correction and offset correction as the temperature compensation for the measurement results shown in FIG. 12 before performing the linearity compensation.
Figure 14:
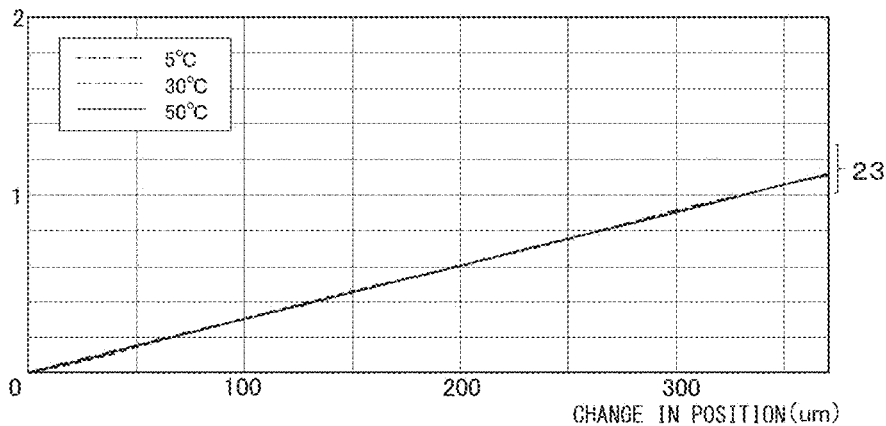
FIG. 14 is a diagram showing the results obtained by performing the linearity compensation for the measurement results acquired for multiple temperatures based on the relations between the position detection signal and the change in position acquired for the respective temperatures based on the results shown in FIG. 13, and by performing the temperature compensation such that the slope does not change due to temperature.

Next, description will be made regarding an example of the linearity compensation and the temperature compensation employed in the lens control apparatus having different characteristics. FIG. 12 shows the measurement results for explaining the change due to temperature in the relation between the position detection signal and the change in position in the lens control apparatus having a relation that is different from that shown in FIG. 5. FIG. 13 is a diagram showing the results subjected to the slope correction and offset correction as the temperature compensation before the linearity compensation is performed. FIG. 14 is a diagram showing the results obtained by performing linearity compensation for the measurement results for the respective temperatures based on the relation between the position detection signal and the change in position for each temperature shown as the results in FIG. 13, and by performing temperature compensation such that there is no difference in the slope between the temperatures.

In FIG. 12, the graphs 21 show the results at the temperatures 5° C., 30° C., and 50° C., which indicate the difference in characteristics due to temperature. From among the three temperatures, two temperatures involve the largest change in the measurement results. The remaining temperature involves an intermediate change in the measurement result, and is selected as a representative temperature. The major difference in the results between FIG. 12 and FIG. 5 is that the result shown in FIG. 12 exhibits degraded linearity. Specifically, a large change occurs in the slope depending on the stroke range.

FIG. 13 shows the results obtained by performing the slope correction for the results shown in FIG. 12 for each temperature before the linearity compensation. The offset correction is executed at the same time as the slope correction. The results are converted such that they are aligned along a graph passing through the origin. The graphs 22 have a remaining non-linear component. Furthermore, the calculation results do not match for the respective temperatures. That is to say, in this example, the slope correction is effectively performed for the range in which the change in position is small. However, the slope correction is not effective for the range in which the change in position is large. In this range, correction deviation occurs. That is to say, in a case in which such characteristics are to be corrected, satisfactory temperature compensation cannot be provided by performing only the slope correction and the offset correction. Thus, in a case in which the result of such a correction operation is subjected to the linearity compensation, this leads to a large correction error.

In a case of correcting such characteristics, the linearity compensation is preferably performed for each temperature based on the function data calculated for each temperature according to the flow shown in FIG. 10. FIG. 14 shows the results obtained by performing the linearity compensation for each temperature using the functions designed based on the measurement data acquired at the respective temperatures 5° C., 30° C., and 50° C., and by performing the slope correction for each temperature such that the calculation results are aligned along a line having the same slope. The graph curves 23 are represented by almost a single straight line. This means that both the linearity compensation and the temperature compensation are provided.

Third Embodiment

Figure 15:
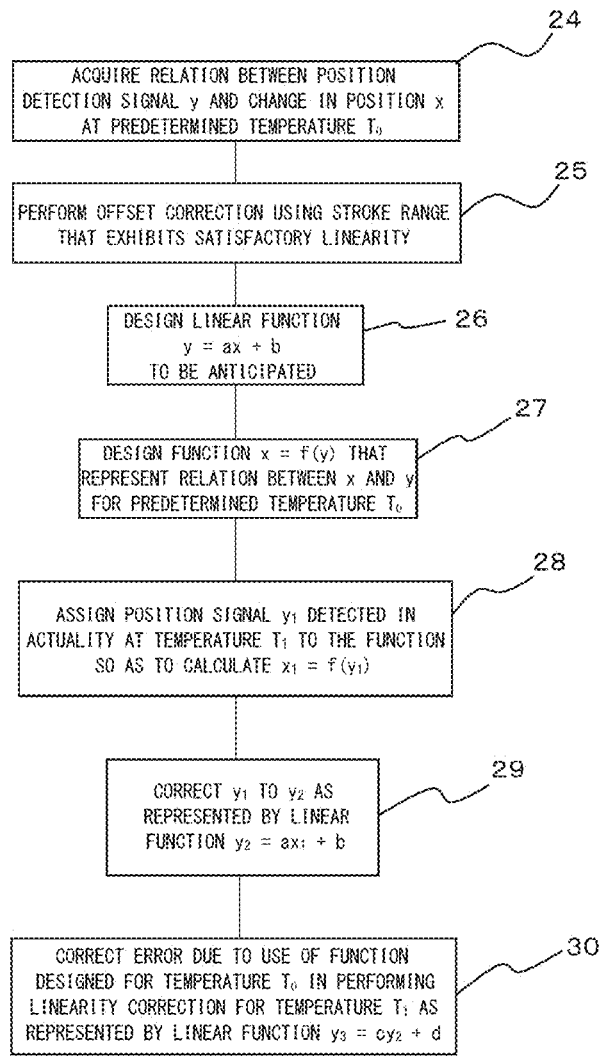
FIG. 15 is a flowchart showing the operations for the temperature compensation and the linearity compensation employed in a lens control apparatus according to a third embodiment of the present invention.
Figure 16:
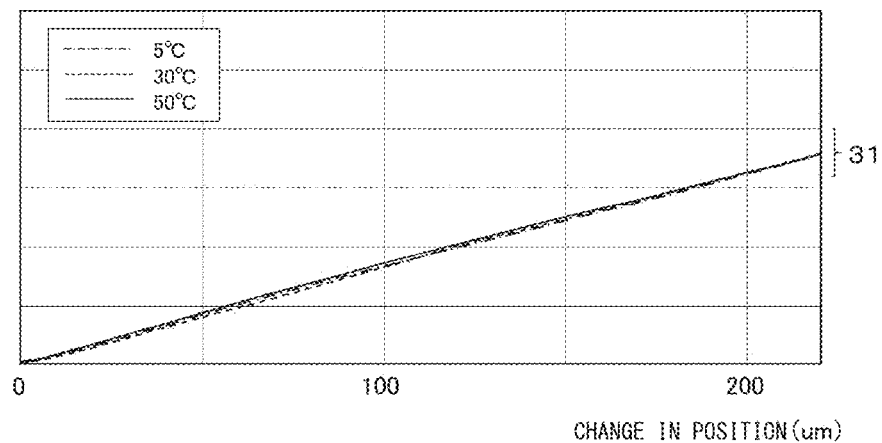
FIG. 16 is a diagram showing the results obtained by performing the linearity compensation and the temperature compensation after the stroke range has been limited.

Description will be made regarding a third embodiment of the present invention with reference to FIG. 15 through FIG. 16. FIG. 15 is a flowchart showing a temperature compensation operation and a linearity compensation operation of the lens control apparatus according to the third embodiment of the present invention. FIG. 16 is a diagram showing the results obtained by performing the linearity compensation and the temperature compensation under a condition in which the stroke range is limited.

In a case in which the characteristics exhibit poor linearity as shown in FIG. 12, by performing the linearity compensation for each temperature using the aforementioned function designed for the corresponding temperature, this provides correction with relatively small correction error. However, such an arrangement requires preparation of the functions designed for respective temperatures, which requires additional time and additional memory capacity. In order to solve such a problem, FIG. 15 shows a flow showing another correction method. The point of difference from the flow shown in FIG. 1 is as follows. That is to say, after acquiring the relation between the position detection signal and the change in position at the predetermined temperature $T_0$, in a case in which judgment is made that satisfactory results of the linearity compensation and the temperature compensation cannot be obtained due to poor linearity, a particular part of the stroke range having poor linearity characteristics is omitted from the correction range. That is to say, the correction is performed for only a stroke range in which satisfactory correction results can be obtained.

In the operation 24, the relation between the position detection signal y and the change in position x is acquired at the predetermined temperature $T_0$, e.g., at the set temperature of the factory.

In the operation 25, the range to be corrected is limited to a part of the stroke range that has been judged to be a range that can be used for the control operation based on the results obtained in the operation 24. After the stroke range is limited, offset correction may be performed such that the limited stroke range includes the origin.

In the operation 26, the linear function y=a*x+b is designed along which the calculation results are to be aligned after the linearity compensation. In a case in which the offset correction is performed before the operation 26, the input data passes through the origin, i.e., b=0 holds true. Thus, in this case, only the slope "a" is derived.

In the operation 27, a function is designed so as to represent the relation between the position detection signal y and the change in position x measured beforehand. In an actual machine such as a cellular phone, y represents a measurement value. Accordingly, a function such as x=f(y) is designed with y as a variable. In order to fit a nonlinear relation with such a function, the function is required to have a second order or more. As the order is raised, the fitting error becomes smaller. However, this involves an increase in the calculation amount. Accordingly, the order may preferably be designed according to the actual conditions. In the linearity compensation described below, a fifth-order function is employed.

In the operation 28, the position detection signal $y_1$ detected in actuality is assigned to the aforementioned function, thereby acquiring a calculated change in positon $x_1$. In a case in which the surrounding temperature is equal to $T_0$, it can be assumed that the measurement result matches the factory measurement result. Even in a case in which the surrounding temperature is $T_1$, which is different from $T_0$, the function x=f(y), which is designed for $T_0$, is also employed.

In the operation 29, $x_1$ obtained in the operation 28 is assigned to the function y=a*x+b designed in the operation 26, so as to calculate $y_2$=a*$x_1$+b. This corrects the measurement value $y_1$ to $y_2$, thereby providing linearity compensation. In this linearity compensation, even in a case of the temperature $T_1$, the expression designed for the temperature $T_0$ is employed. This leads to error due to the difference between the temperatures $T_0$ and $T_1$.

In the operation 30, the temperature compensation is performed so as to correct such error. Specifically, the temperature correction is performed by means of slope correction and offset correction of a linear function, thereby obtaining $y_3$=c*$y_2$+d. In a case in which the relation expression passes through the origin, only the slope correction may preferably be performed.

FIG. 16 shows the result obtained by performing the linearity compensation and the temperature compensation under such a condition in which the stroke range is limited as described above. As shown in graphs 31, this involves a small amount of correction error. However, this provides both linearity compensation and temperature compensation with high precision.

It should be noted that description will be made regarding an arrangement in which a part of the stroke range having poor linearity is omitted, and only the range to be used is shown on the graphs. However, in an actual apparatus, it is not always necessary to disable the operation in such a stroke range having poor linearity, or otherwise to disable the output of the position detection signal for such a stroke range, and such linearity deviation or change in temperature may be tolerated for such a range.

As described above, in a case in which it is difficult to obtain linearity over the overall stroke region and to suppress the change due to temperature, by securing linearity for predetermined positions or a predetermined stroke range so as to suppress the change due to temperature, this provides improved performance for at least such a predetermined stroke range. The positions or the stroke range for which the linearity compensation and the temperature compensation are to be optimized may preferably be determined according to the purpose. For example, in a case of designing the linearity compensation and the temperature compensation for an AF mechanism, and in a case in which high priority is assigned to landscape photography, the linearity compensation and the temperature compensation are preferably optimized for the infinity distance range. On the other hand, in a case in which high priority is assigned to a self-portrait, the linearity compensation and the temperature compensation are preferably optimized for a lens position range that corresponds to a subject distance on the order of 1 m. In a case of designing the linearity compensation and the temperature compensation for an OIS mechanism, the linearity compensation and the temperature compensation are preferably optimized for a range including the vicinity of a neutral position of a spring or a centering setting position in a state in which no optical image stabilization is input.

Fourth Embodiment

Figure 17:
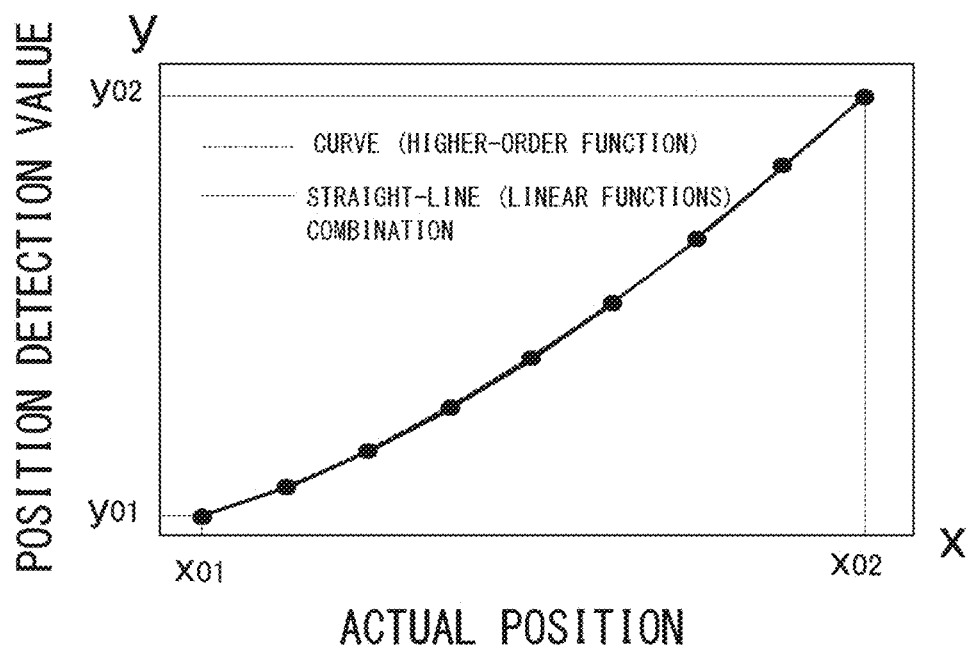
FIG. 17 is a diagram for explaining linear approximation of the function according to a fourth embodiment.

Description will be made regarding a fourth embodiment of the present invention with reference to FIG. 17. FIG. 17 is a diagram for explaining a method for performing linear approximation of the function according to the fourth embodiment. Description has been made in the first through third embodiments regarding an arrangement in which, in a case in which the relation between the position detection signal y and the change in position x at the predetermined temperature $T_0$ is non-linear, the correction operation is performed using a higher-order function, e.g., fifth-order function. However, in a case in which the linearity compensation is performed in an actual image capture apparatus with calculation involved in such a fifth-order function, this requires a long calculation time, and requires a large memory capacity for storing intermediate calculation results. In order to solve such a problem, after the range to be represented by the function x=f(y) is divided into multiple sections, each section thus divided may be approximated by a linear function. This has the potential to involve a small amount of degradation in the calculation precision. However, in a case in which an actuator has x-y characteristics that vary smoothly, such linear interpolation has almost no adverse effect. In a case of correcting the stroke range of an AF mechanism or an OIS mechanism of a typical camera module, the linear interpolation may preferably be performed by connecting a sufficient number of representative points, the number of which is on the order of 16 to 20. This provides satisfactory results FIG. 17 shows the measurement points each represented by a solid circle, a higher-order function obtained by means of data fitting based on the measurement points, which is represented by the broken line, and the approximation result obtained by connecting adjacent representative points by a straight line, which is represented by the solid line. In a case in which the linear connection approximation is performed based on a sufficient number of measurement points, there is not a large difference in the approximation result as compared with the higher-order function approximation. In this case, a pair of an x value and a y value for each measurement point may preferably be stored in the form of a correction table in memory. For the operation 5 or the like shown in FIG. 2, when the position detection signal $y_1$ is detected at a position between the measurement points thus stored, the $x_1$ value may preferably be calculated using the data of the adjacent measurement points thereof, and specifically, based on a linear function that connects the two measurement points.

An arrangement is conceivable in which the adjacent measurement points are connected without designing such a function. However, with such an arrangement, if the measurement result obtained at a given representative point has a serious noise component, i.e., if the selected representative point is a singular point, in a case in which the measurement points are directly connected by a straight line, this results in poor smoothness. It can be assumed that the actual characteristics smoothly vary as compared with the aforementioned example. In order to solve such a problem, after a smoothly curved function is designed so as to represent the measurement results, linear connection approximation is preferably performed for the function thus designed. In designing the function, a function is preferably selected so as to provide least mean square error with respect to the measurement points, instead of designing a function that passes through all the measurement points.

Next, specific description will be made regarding an example configuration of the lens control apparatus 400.

Figure 18:
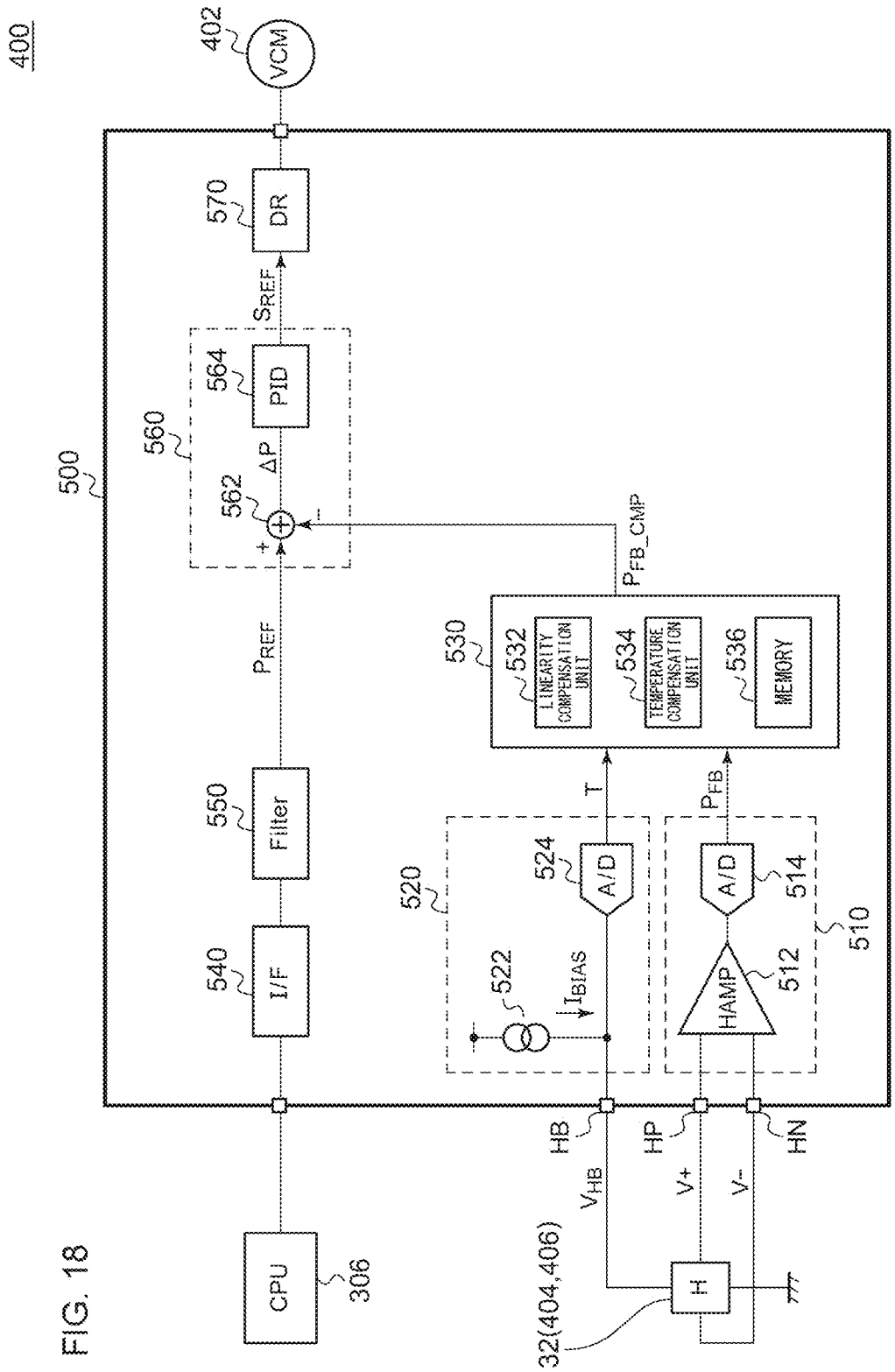
FIG. 18 is a block diagram showing a system configuration of the lens control apparatus.

FIG. 18 is a specific block diagram showing the lens control apparatus 400. The position detector 404 is configured as a Hall element 32. The Hall element 32 generates a Hall voltage $V_+$, $V_-$ that corresponds to the change in the position of a movable portion of the actuator 402, and supplies the Hall voltage to Hall detection pins (HP, HN) of the actuator driver IC 500.

A position detection unit 510 generates a digital position detection value $P_{FB}$ that indicates the position (change in position) of the movable portion of the actuator 402, based on the Hall voltage $V_+$, $V_-$. The position detection unit 510 includes a Hall amplifier 512 that amplifies the Hall voltage, and an A/D converter 514 that converts the output of the Hall amplifier 512 into the position detection value $P_{FB}$ in the form of a digital value.

A temperature detection unit 520 generates a temperature detection value T that indicates the temperature. As described above, the temperature detection value preferably represents the temperature of the position detector 404. In FIG. 18, the Hall element 32 configured as the position detector 404 is also employed as the temperature detector 406. Such an arrangement is configured to make use of the fact that an internal resistance r of the Hall element 32 has temperature dependence. The temperature detection unit 520 measures the internal resistance r of the Hall element 32, and uses the information that indicates the temperature.

The temperature detection unit 520 includes a constant current circuit 522 and an A/D converter 524. The constant current circuit 522 supplies a predetermined bias current $I_{BIAS}$ to the Hall element 32. The bias current $I_{BIAS}$ is a power supply signal that is required to operate the Hall element 32. Accordingly, the constant current circuit 522 can be regarded as a Hall bias circuit.

A voltage drop $I_{BIAS} \times r$ occurs across the Hall element 32. The voltage drop is input to a Hall bias pin (HB). The A/D converter 524 converts the voltage $V_{HB}$ ($=I_{BIAS} \times r$) applied to the HB pin into a digital value T. The bias current $I_{BIAS}$ is a known and constant current. Thus, the digital value T is configured as a signal that is proportional to the internal resistance r. Accordingly, the digital value T includes temperature information with respect to the Hall element 32. The relation between the internal resistance r and the temperature is measured beforehand. The relation thus measured is held in the form of a function or otherwise a table. In the correction unit 530 configured as a downstream stage, the digital value T is converted into the temperature information.

The interface circuit 540 receives, from the processor 306, a target code TC that indicates the target position of the movable portion of the actuator 402. For example, the interface circuit 540 may be configured as a serial interface such as an I²C (Inter IC) interface. A filter 550 filters the target code TC received by the interface circuit 540, and generates a position instruction value $P_{REF}$. In a case in which the position instruction value $P_{REF}$ suddenly changes, this has the potential to involve ringing in the position of the lens 304. By providing the filter 550, such an arrangement suppresses the ringing.

The correction unit 530 corrects the position detection value $P_{FB}$ received from the position detection unit 510. Specifically, the correction unit 530 includes a linearity compensation unit 532, a temperature compensation unit 534, and memory 536. The linearity compensation unit 532 corrects the linearity of the relation between the position detection value $P_{FB}$ and the actual position (the aforementioned x-y characteristic). The memory 536 stores the aforementioned parameters a and b, data that represent the function x=f(y) (e.g., coefficients $k_0$ through $k_5$), parameters c and d, etc. The memory 536 may be configured as nonvolatile memory such as ROM or flash memory. Otherwise, the memory 536 may be configured as volatile memory that temporarily stores data to be supplied from external ROM every time the circuit is started up.

The temperature compensation unit 534 corrects the change in the relation between the position detection value $P_{FB}$ and the actual position that occurs due to the change in temperature.

For example, in the first embodiment, the operation of the linearity compensation unit 532 corresponds to the operations 4 and 5 in the flowchart shown in FIG. 2. The operation of the temperature compensation unit 534 corresponds to the operation 6 in the flowchart shown in FIG. 2.

In the second embodiment, the operation of the linearity compensation unit 532 corresponds to the operation 19 in the flowchart shown in FIG. 10. The operation of the temperature compensation unit 534 corresponds to the operation 18 in the flowchart shown in FIG. 10.

In the third embodiment, the operation of the linearity compensation unit 532 corresponds to the operations 28 and 29 in the flowchart shown in FIG. 15. The operation of the temperature compensation unit 534 corresponds to the operation 30 in the flowchart shown in FIG. 15.

The controller 560 receives the position instruction value $P_{REF}$ and a position detection value $P_{FB\_CMP}$ subjected to the correction by means of the correction unit 530. The controller 560 generates a control instruction value $S_{REF}$ such that the position detection value $P_{FB\_CMP}$ matches the position instruction value $P_{REF}$. In a case in which the actuator 402 is configured as a voice coil motor, the control instruction value $S_{REF}$ is an instruction value that indicates a driving current to be supplied to the voice coil motor. The controller 560 includes an error amplifier 562 and a PID controller 564, for example. The error amplifier 562 generates a difference (error) ΔP between the position detection value $P_{FB\_CMP}$ and the position instruction value $P_{REF}$. The PID controller 564 generates the control instruction value $S_{REF}$ by means of a PID (Proportional Integral Derivative) calculation. Instead of employing the PID controller 564, a PI controller may be employed. Also, a non-linear control operation may be performed.

A driver 570 supplies a driving current that corresponds to the control instruction value $S_{REF}$ to the actuator 402.

As can be understood from FIG. 18, the Hall voltage $V_+$, $V_-$ is output from the Hall element 32 via the terminals that differ from a terminal to which the control current is applied. That is to say, the change in the resistance value of the Hall element 32 does not include a component due to the change in temperature and a component due to the change in position in a mixed manner, unlike a shape memory alloy sensor. This provides both the position detection and the temperature detection with high precision.

The operations of the correction unit 530 and the controller 560 may be supported by means of hardware components such as an adder, multiplier, etc. Also, such operations may be supported by means of a combination of a CPU and a software program.

Figure 19:
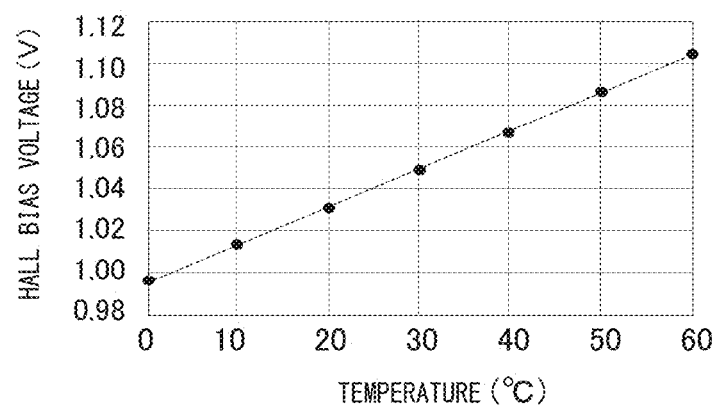
FIG. 19 is a diagram showing the temperature dependence of the resistance value of a Hall element.

FIG. 19 is a diagram showing the temperature dependence of the resistance value of the Hall element. The solid circles represent the measurement results. The broken line represents a linear approximation of the change in the measurement results. As described above, the change in temperature can be detected based on the change in the resistance value of the Hall element that occurs due to temperature. A constant bias current is applied to the Hall element, which allows a change in the resistance value to be detected as a change in the bias voltage. As shown in FIG. 19, the relation between the temperature and the Hall bias voltage is approximately linear. Based on this result, it can be understood that the change in temperature can be detected by monitoring the change in the bias voltage of the Hall element.

A notable feature is that the change in temperature of the resistor on the bias side that is driven with a constant current is monitored in the form of a change in voltage, instead of monitoring the change in the output of the Hall element that occurs due to temperature. In a case in which the output voltage of the Hall element is monitored, this is subject to effects of the temperature characteristics of a Hall amplifier and to effects of the temperature characteristics of the magnetic flux density in addition to the temperature characteristics of the Hall element itself. Thus, it is difficult to purely detect only the change in temperature. In contrast, in a case of monitoring the change in voltage on the bias side, the factor of the change due to the temperature is mostly restricted to the change in resistance of the Hall element. This allows the temperature to be detected.

It should be noted that description has been made with reference to FIG. 18 regarding an arrangement in which the temperature detected by means of the Hall element is used for the temperature compensation of the relation between the position detection signal and the actual position. However, the present invention is not restricted to such an arrangement. The detected temperature information may be used for abnormal temperature detection, protection (thermal shutdown) accompanying an abnormal temperature state, or the like. Alternatively, the detected temperature information may be stored in a register so as to allow the CPU 306 to read out the detected temperature information thus stored.

The lens control apparatus as described above is employed in a camera module of a cellular phone or the like. In particular, one suitable application of the lens control apparatus according to the present invention is an image capture apparatus including an image sensor having a phase difference detection means. The focusing deviation and the deviation direction can be estimated based on the phase difference detection results. Accordingly, by associating the phase difference detection results with the position detection signal beforehand, such an arrangement is capable of estimating the amount of change in the position detection signal required to change the position from the current position to the focal position. Subsequently, the position access operation is performed up to a target position indicated by a code of the position detection signal, thereby allowing the focal state to be directly obtained. It should be noted that, with such an arrangement, linear calculation is performed in order to calculate the amount of change in the position detection signal required to change the position up to the target position. Accordingly, in order to reduce the error in position, it is important for the relation between the position detection signal and the change in position to have linearity. In addition, in a case in which the relation between them deviates due to temperature, the position deviates from the target position even after the current position is changed up to a position indicated by the code number that represents the target position. Accordingly, it is also important to support the temperature compensation. By applying the present invention, this provides both the linearity compensation and the temperature compensation. Thus, the present invention is preferably applicable to an image capture apparatus including an image sensor having a phase difference detection means.

Another suitable application of the lens control apparatus according to the present invention is an image capture apparatus mounting multiple cameras such as a dual camera. An application is conceivable that is configured to interlink the operations of the two cameras, and to combine images captured by the two cameras so as to acquire a zoom image, for example. In this case, the position detection signal is an instruction to drive the lens positions of the two cameras in an interlinked manner. In a case in which the interlinking between them deviates due to temperature, this leads to a position error, and in some cases, this results in adverse effects on the image even after calibration is performed so as to secure such interlinking between them and the linearity compensation is performed. In particular, in a case in which there is a difference in the temperature characteristics between the two cameras, it is needless to say that error occurs in an instruction for changing the position to a given position. In addition, there is a difference between the amount of deviation between them. Thus, in a case in which the same temperature compensation is performed for the two cameras, such an arrangement is not capable of providing a high-precision position control operation. By applying the present invention, such an arrangement provides both the linearity compensation and the temperature compensation. Furthermore, this allows such compensation to be executed for each camera. Thus, the present invention is preferably applicable to an image capture apparatus mounting multiple cameras such as a dual camera or the like.

While the preferred embodiments of the present invention have been described using specific terms, such description is for illustrative purposes only, and it is to be understood that changes and variations may be made without departing from the spirit or scope of the appended claims.

What is claimed is:

1. A lens control apparatus comprising:
   a lens;
   an actuator structured to position the lens;
   a Hall element having a first end grounded and structured to generate a position detection signal that indicates a position of the lens;
   a current source coupled to a second end of the Hall element and structured to supply a constant current having predetermined current amount;
   a temperature detection unit coupled to the second end of the Hall element and receiving a voltage at the second end of the Hall element, and structured to detect a temperature based on a voltage at the second end of the Hall element in a state in which the constant current is flowing through the Hall element; and
   a control unit structured to control the actuator such that the position detection signal approaches a position instruction signal that indicates a target position of the lens.

2. The lens control apparatus according to claim 1, wherein the control unit comprises a temperature compensation unit structured to correct a temperature dependence of a relation between the position detection signal and a corresponding actual position of the lens.

3. The lens control apparatus according to claim 2, wherein the control unit further comprises a linearity compensation unit structured to correct a linearity of the relation.

4. The lens control apparatus according to claim 3, wherein the relation is acquired at a predetermined temperature,
   wherein the control unit further comprises a memory structured to store information with respect to the relation,
   wherein the linearity is corrected for a current temperature that differs from the predetermined temperature, based on the relation acquired at the predetermined temperature,
   and wherein temperature compensation is performed with a predetermined correction coefficient supplied according to a difference between the predetermined temperature and the current temperature.

5. The lens control apparatus according to claim 3, wherein the relations are acquired for a plurality of predetermined temperatures,
   wherein the control unit further comprises a memory structured to store information with respect to the relations,
   wherein the linearity is corrected for a current temperature that differs from the predetermined temperatures, based on the relation acquired for one from among the plurality of temperatures that is closest to the current temperature,
   and wherein temperature compensation is performed such that the relation is represented by a straight line having a slope that is unrelated to the temperature.

6. The lens control apparatus according to claim 3, wherein the relations are acquired for a plurality of predetermined temperatures,
   wherein the control unit further comprises a memory structured to store information with respect to the relations,
   wherein the relation is generated for the current temperature based on the relations acquired for adjacent temperatures between which the current temperature is positioned, from among the plurality of predetermined temperatures,
   wherein linearity compensation is performed based on the relation thus generated,
   and wherein temperature compensation is performed such that the relation is represented by a straight line having a slope that is unrelated to the temperature.

7. An image capture apparatus comprising:
   a lens control apparatus according to claim 1; and
   an image sensor that is capable of performing phase difference detection in order to support an autofocus control operation,
   wherein temperature compensation and linearity compensation are employed in detection of a position of the lens in order to support an autofocus control operation.

8. An image capture apparatus comprising a plurality of camera modules,
   wherein each camera module comprises the lens control apparatus according to claim 1,
   and wherein temperature compensation and linearity compensation are employed in detection of a position of the lens in order to support an autofocus control operation for each camera module.

* * * * *